United States Patent [19]

Kost

[11] 4,360,310
[45] Nov. 23, 1982

[54] ARRANGEMENT FOR POSITIONING A DEVICE FOR CLOSING AND OPENING PRESSURE VESSELS

[75] Inventor: Friedrich-Wilhelm Kost, Bochum, Fed. Rep. of Germany

[73] Assignee: Kloeckner-Werke AG, Duisburg, Fed. Rep. of Germany

[21] Appl. No.: 156,212

[22] Filed: Jun. 3, 1980

[30] Foreign Application Priority Data

Jun. 3, 1979 [DE] Fed. Rep. of Germany ... 7916956[U]

[51] Int. Cl.³ .............................................. C10B 25/14
[52] U.S. Cl. .................................. 414/684.3; 212/166
[58] Field of Search ..................... 414/681, 684.3, 387; 212/166

[56] References Cited

U.S. PATENT DOCUMENTS

| | | | |
|---|---|---|---|
| 923,156 | 6/1909 | Downie | 212/166 X |
| 980,951 | 1/1911 | Hitner | 212/166 X |
| 999,349 | 8/1911 | Taussig | 212/166 X |
| 3,281,880 | 11/1966 | Bender | 212/166 X |
| 3,419,163 | 12/1968 | Kostochka | 212/166 X |

Primary Examiner—John J. Love
Assistant Examiner—Gene A. Church
Attorney, Agent, or Firm—Michael J. Striker

[57] ABSTRACT

An arrangement for positioning a device for closing and opening a pressure vessel, has a positioning vehicle arranged to carry the device, and a positioning track attachable to the pressure vessel and extending from just above the floor under the pressure vessel to the pressure vessel so that the positioning track guides the positioning vehicle when the latter is displaced from the floor to the pressure vessel to close the latter, and from the pressure vessel back to the floor to open the pressure vessel.

9 Claims, 2 Drawing Figures

ARRANGEMENT FOR POSITIONING A DEVICE FOR CLOSING AND OPENING PRESSURE VESSELS

BACKGROUND OF THE INVENTION

The present invention relates to an arrangement for positioning a device for closing and opening a pressure vessel with use of screws, such as a steam generator.

Arrangements for positioning devices for closing and opening pressure vessels are known in the art. Known arrangements for positioning screw tightening devices or access covers possess, however, some disadvantages. These disadvantages are connected with the fact that the exact positioning encounters some difficulties because of the "wandering" of the pressure vessel as a result of its thermal expansion, within the range of between 40 and 60 mm. In order to attach the screw tightening device or the access cover to the pressure vessel after such "wandering", it is necessary in the known positioning systems to perform an adjustment before each attaching step.

SUMMARY OF THE INVENTION

Accordingly, it is an object of the present invention to provide an arrangement for positioning a device for closing and opening a pressure vessel, which avoids the disadvantages of the prior art.

More particularly, it is an object of the present invention to provide an arrangement which guarantees fast and exact attachment of the device on the opening of the pressure vessel. The fast and exact positioning of the device is mentioned here in the sense that the positioning arrangement is adjusted during the initial mounting, whereupon further adjustments before the subsequent attaching steps are no longer needed.

In keeping with these objects and with others which will become apparent hereinafter, one feature of the present invention resides, briefly stated, in an arrangement which has a positioning vehicle arranged to carry the device, and a positioning track attachable to the pressure vessel and extending from just above the floor under the pressure vessel to the pressure vessel so as to guide the positioning vehicle from the floor to the pressure vessel and vice versa, and to close the pressure vessel or to open the same, respectively.

When the arrangement is designed in accordance with the present invention, the device can be attached to the opening of the pressure vessel fast and exactly. No additional adjustments are required before the individual attaching steps.

In accordance with another feature of the present invention, the positioning track is composed of two mutually parallel positioning rails.

In accordance with still another advantageous feature of the present invention, the positioning rails are adjustably mounted on the floor.

A further feature of the present invention resides in that the lower portion of the positioning track extends normal to the floor, whereas the upper portion of the positioning track extends parallel to the axis of the opening of the pressure vessel.

Finally, a still further feature of the present invention is that the positioning vehicle can be displaced by rope means or chain means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
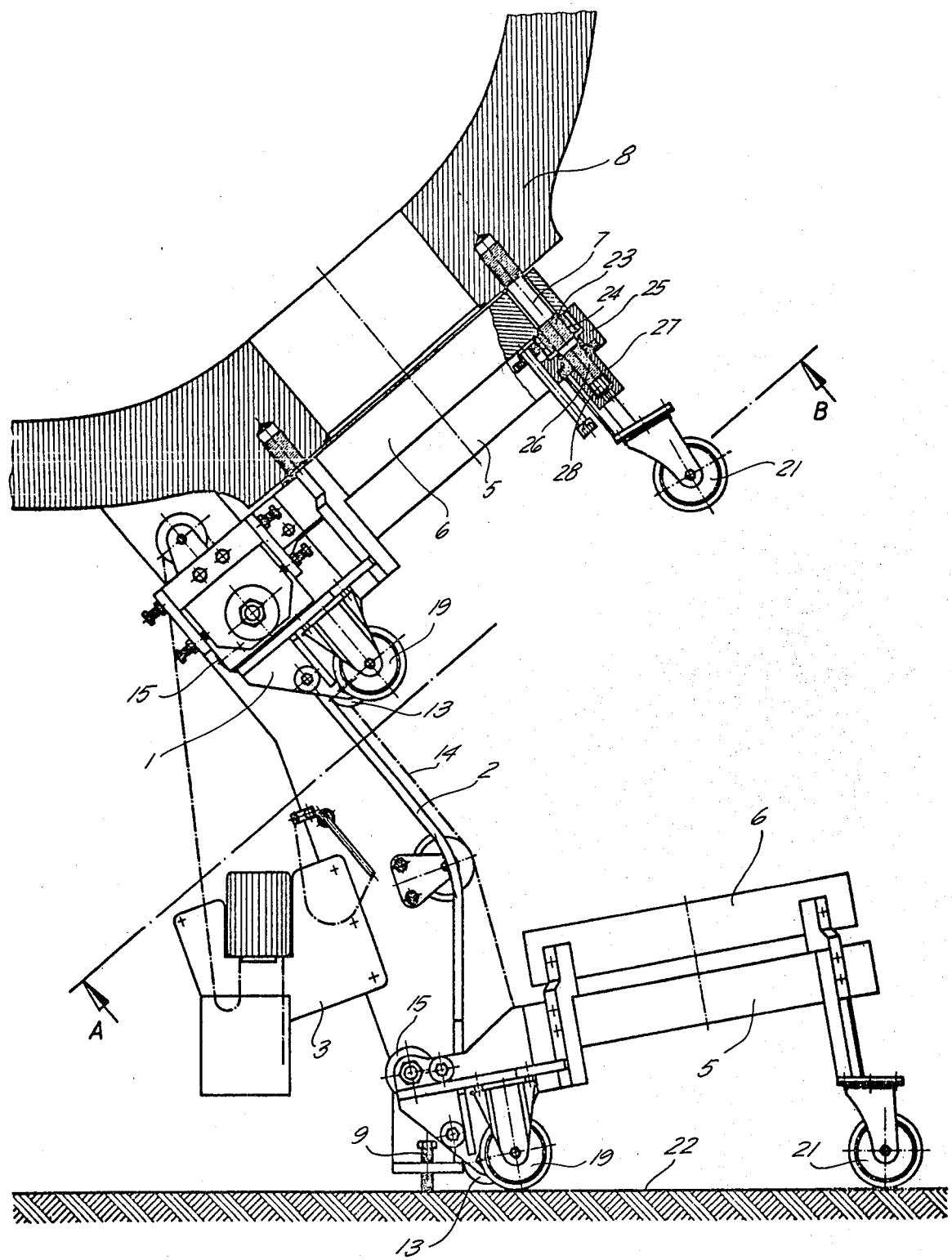
FIG. 1 is a side view of an arrangement for positioning a device for closing and opening pressure vessels.

An arrangement for positioning a device for closing and opening a pressure vessel includes a positioning vehicle identified by reference numeral 1 and a positioning track identified by reference numeral 2.

The arrangement is mounted on the respective parts of a pressure vessel 8 by adjusting screws. More particularly, the positioning track is mounted in the illustrated example by eight adjusting screws, of which only four upper adjusting screws are shown in the drawings. The positioning track 2 forms with the pressure vessel 8 a unit so that displacement of former relative to the latter cannot take place. In order to place the positioning track 2 in the state of functional readiness, thrust screws 9 must be tightened.

The positioning vehicle 1 carries a device 5 with a closure cover 6. The device 5 is fixedly mounted on the positioning vehicle 1 and serves for screwing of the cover 6 to the pressure vessel 8. The positioning vehicle 1 is displaceable between a lower position just above the floor under the pressure vessel 8 and a higher position adjacent to the latter.

Figure 2:
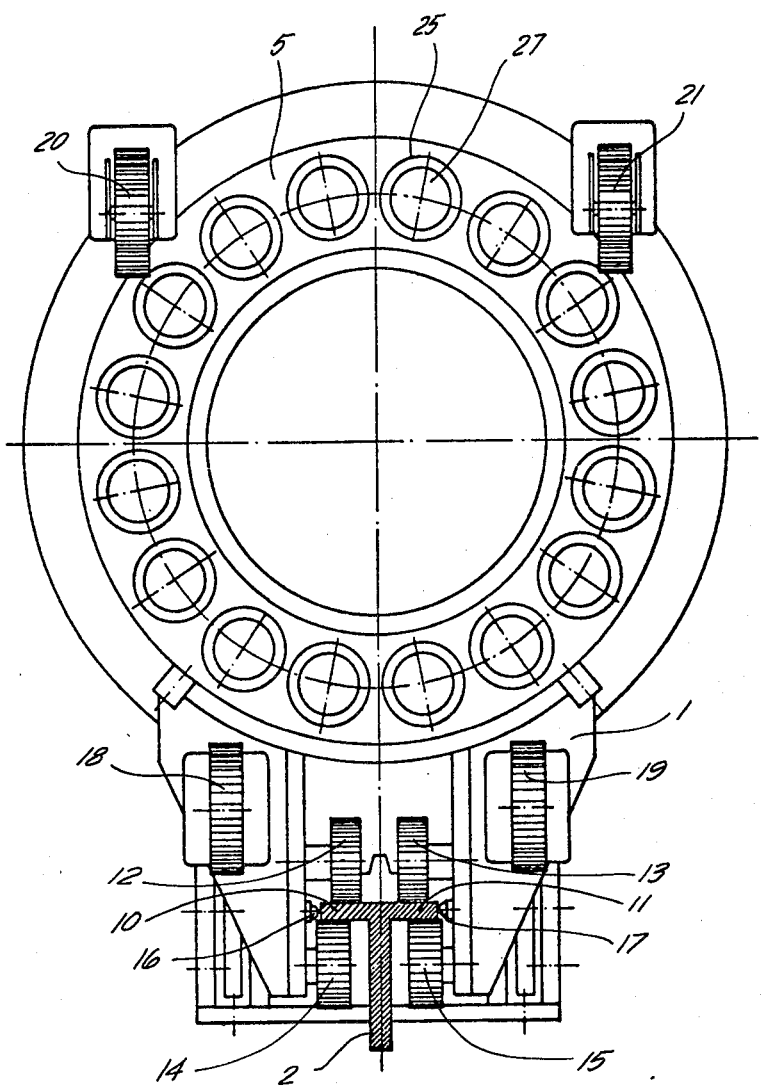
FIG. 2 is a view showing a section taken along the line A-B in FIG. 1.

The positioning track 2 is T-shaped as shown particularly in FIG. 2. It has two flanks or rails 10 and 11 which extend at opposite sides of a central web of the positioning track 2. Rollers 12 and 13 at the one side and rollers 14 and 15 at the other side run over the flanks 10 and 11 of the positioning track 2. Spherical guide members 16 and 17 are located on the positioning vehicle 1 at the opposite sides of the flanks 10 and 11 of the positioning track 2, so that the positioning vehicle 1 is guided along the positioning track 2 during its displacement.

The positioning vehicle has two pairs of wheels 18, 19 and 20, 21 and runs on the floor or on rails 22 arranged on the floor, with the aid of the above-mentioned wheels 18–21.

Each of screws 7 has a thread 23 on which a nut 24 is screwed. A tightening cylinder 25 abuts against the cover 6 and overlaps the nut 24. Each of the screws 7 further has a counter nut 27 for stretching the screws 7. A hexahedral portion 28 serves for screwing the screws 7 into the pressure vessel and unscrewing the screws 7 out of the same, with the aid of a tool.

As can be seen from FIG. 1, the positioning track has a lower portion which extends normal to the floor, and an upper portion which extends parallel to the axis of the opening of the pressure vessel 8. Means is provided for displacing the positioning vehicle 1 along the positioning track 2. The displacing means includes a rope or a chain 4 and a winch 3 which can be driven manually, electrically or pneumatically.

The positioning track 2 is adjusted during the first mounting step. This adjustment is performed so that the device 5 with the closing cover 6 is unobjectionably displaced over the positioning track 2 so as to approach the pressure vessel 8 and to fit on the screws 7 which are screwed in the pressure vessel 8.

After this, the nuts are screwed onto the screws 7, and the opening of the pressure vessel 8 will be closed. The process of opening of the pressure vessel is performed in the reverse order.

It will be understood that each of the elements described above, or two or more together, may also find a useful application in other types of constructions differing from the types described above.

While the invention has been illustrated and described as embodied in an arrangement for positioning a device for opening and closing pressure vessels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for positioning a device for closing and opening a pressure vessel with use of screws, such as a steam generator by screwing the device to and unscrewing the device from the pressure vessel, the arrangement comprising a positioning vehicle arranged to carry the device; and a positioning track attachable to the pressure vessel and extending from just above a floor under the pressure vessel to the pressure vessel, said positioning track being arranged to guide said positioning vehicle so that the latter can be displaced from the floor to the pressure vessel so as to bring the device to and to close the pressure vessel, and from the pressure vessel to the floor so as to open the pressure vessel, with the guidance over said positioning track.

2. An arrangement as defined in claim 1, wherein said positioning track is adjustably attachable to the pressure vessel.

3. An arrangement as defined in claim 1, wherein said positioning track comprises two parallel rails.

4. An arrangement as defined in claim 1, wherein said positioning track is adjustably supported on the floor.

5. An arrangement as defined in claim 1, wherein said positioning track has an upper portion near the pressure vessel and a lower portion near the floor, said lower portion extending normal to the floor.

6. An arrangement as defined in claim 1, wherein the pressure vessel has an opening closable and openable by the device and having an axis, said positioning track having an upper portion near the pressure vessel and a lower portion near the floor, said upper portion of said positioning track being arranged to extend parallel to the axis of the pressure vessel.

7. An arrangement as defined in claim 1; and further comprising means for displacing said positioning vehicle over said positioning track.

8. An arrangement as defined in claim 7, wherein said displacing means includes a rope.

9. An arrangement as defined in claim 7, wherein said displacing means includes a chain.

* * * * *